United States Patent
Glazer et al.

(10) Patent No.: US 6,886,101 B2
(45) Date of Patent: Apr. 26, 2005

(54) PRIVACY SERVICE

(75) Inventors: Elliott Glazer, Chesterfield, VA (US); Fred Bishop, Glendale, AZ (US)

(73) Assignee: American Express Travel Related Services Company, Inc., New York, NY (US)

(*) Notice: Subject to any disclaimer, the term of this patent is extended or adjusted under 35 U.S.C. 154(b) by 0 days.

(21) Appl. No.: 10/283,434

(22) Filed: Oct. 30, 2002

(65) Prior Publication Data

US 2004/0088295 A1 May 6, 2004

(51) Int. Cl.[7] .................................................. H04L 9/00
(52) U.S. Cl. ........................................ 713/200; 707/9
(58) Field of Search ................................ 713/200–202; 707/1–10; 705/22, 26, 28, 14, 30, 35

(56) References Cited

U.S. PATENT DOCUMENTS

| | | |
|---|---|---|
| 5,721,827 A | 2/1998 | Logan et al. |
| 5,855,008 A | 12/1998 | Goldhaber et al. |
| 5,875,296 A | 2/1999 | Shi et al. |
| 5,910,987 A * | 6/1999 | Ginter et al. ................. 705/52 |
| 6,085,191 A | 7/2000 | Fisher et al. |
| 6,115,709 A | 9/2000 | Gilmour et al. |
| 6,128,663 A | 10/2000 | Thomas |
| 6,253,203 B1 * | 6/2001 | O'Flaherty et al. ............ 707/9 |
| 6,275,824 B1 * | 8/2001 | O'Flaherty et al. ............ 707/9 |
| 6,308,203 B1 | 10/2001 | Itabashi et al. |
| 6,327,574 B1 | 12/2001 | Kramer et al. |
| 6,327,609 B1 | 12/2001 | Ludewig et al. |
| 6,345,293 B1 | 2/2002 | Chaddha |
| 6,363,488 B1 | 3/2002 | Ginter et al. |
| 2001/0011247 A1 | 8/2001 | O'Flatery et al. |
| 2001/0034723 A1 | 10/2001 | Subramaniam |
| 2001/0049620 A1 | 12/2001 | Blasko |
| 2002/0024947 A1 | 2/2002 | Luzzatti et al. |
| 2002/0026345 A1 | 2/2002 | Juels |
| 2002/0026519 A1 | 2/2002 | Itabashi et al. |
| 2002/0029201 A1 | 3/2002 | Barzilai et al. |
| 2002/0033416 A1 | 3/2002 | Gerszberg et al. |

FOREIGN PATENT DOCUMENTS

| | | | | |
|---|---|---|---|---|
| EP | 1089196 A2 * | 4/2001 | ........... | G06F/17/30 |
| WO | WO 99/63886 | * 12/1999 | ............ | A61B/5/00 |

OTHER PUBLICATIONS

Lorrie Cranor et al.; The Platform for Privacy Preferences 1.0 (P3P1.0) Specification; web site: http://www.w3.org/TR/2001/WD-P3P-20010928; Sep. 28, 2001.

* cited by examiner

*Primary Examiner*—Emmanuel Moise
*Assistant Examiner*—Christopher Revak
(74) *Attorney, Agent, or Firm*—Snell & Wilmer L.L.P.

(57) ABSTRACT

A system and method providing a privacy service for facilitating the auditing and control of privacy data such as demographic and financial information. In accordance with one embodiment, the system suitably includes a database, a registration module, a tracking module, and an audit module. A consumer, corporation, or other user may use the system to perform a self audit of their privacy data to see how the privacy data is collected, used and disseminated by various third party entities such as merchants, financial institutions, marketing organizations and the like. Tracking information related to the use, collection and dissemination of the privacy data is stored by the system for later access by the user.

20 Claims, 6 Drawing Sheets

PRIVACY SERVICE

1. TECHNICAL FIELD

The present invention generally relates to privacy data. More specifically, the present invention relates to a system and method for monitoring and controlling how privacy data is collected, assembled, and used.

2. BACKGROUND INFORMATION

With the recent popularization of the Internet, electronic commerce has become more and more commonplace. When entering into an electronic transaction, individuals often provide various items of privacy data to a web site such as demographic data and/or personal financial data (e.g., credit card information). Unfortunately, individuals do not have sufficient ability to monitor and/or control how their privacy data is collected, assembled, or used.

One current initiative is the Platform for Privacy Preferences Project (P3P) standard that enables web sites to communicate their privacy practices to individuals. However, P3P will only instruct the individual whether or not a web site privacy policy agrees with the individual's privacy preferences. That is, when an individual accesses a web site with a P3P-enabled browser, the browser will obtain the web site's P3P policy and compare the policy to the individual's preconfigured preferences. If the web site is not in agreement with the individual's privacy preferences, the individual will be notified by the browser, however, there is no ability for the user to audit how their privacy data is used by the web site.

Unfortunately, the privacy data provided by an individual to a web site or other entity can be misused, either intentionally or unintentionally. For example, the privacy data may be disseminated to third parties without the user's consent or knowledge. In addition, the user's privacy data may be provided inaccurately without the individual's knowledge. For example, the individual's old address may be stored by the web site such that the wrong address is associated with the individual. This incorrect address may then be used and/or distributed by the web site without the individual's knowledge.

SUMMARY

In an exemplary embodiment, the present invention includes a privacy service system that allows a user to self audit their privacy data. The system tracks all privacy data including the collection, use and dissemination of privacy data. The system collects privacy data from various sources including the consumer and third party entities. The system stores the privacy data in a suitable database and permits the user to perform a self audit of the privacy data. The data may be stored in a centralized database or in databases that are distributed.

In one embodiment of the present invention, the privacy service system comprises a database for storing the privacy data, a registration module configured to register the user for the privacy service, a tracking module configured to track access to the privacy data, and an audit module configured to allow the user to audit the privacy data.

BRIEF DESCRIPTION OF THE DRAWINGS

A more complete understanding of the present invention may be derived by referring to the detailed description when considered in connection with the Figures, where like reference numbers refer to similar elements throughout the Figures, and.

DETAILED DESCRIPTION OF EXEMPLARY EMBODIMENTS

According to various embodiments of the invention, the shortcomings of the prior art are overcome by providing for a privacy service system that facilitates monitoring and/or controlling how privacy data is collected, assembled, and/or used. Consumers may use the privacy service system to self-audit their privacy data so that they can track how the information is collected and/or disseminated. As used in this description, consumers may include any user, individual, small business, corporation, government entity, software application, and the like.

If desired, consumers can correct inaccuracies in their privacy data and consumers can specify which privacy data can be used by specific entities or service providers and how the privacy data can be used by that entity. Additionally, service providers and other third party entities may provide their privacy policy so that consumers can evaluate how their privacy data will be used by the third party entity and therefore make a better determination as to whether to provide their privacy data to the third party entity. The consumer may also receive rewards, such as a monetary reward or redeemable points in exchange for allowing their data to be used or disseminated.

The present system and method provides a valuable service because consumers will be able to use the system to obtain a desired level of privacy for their demographic data, financial data and any other type of data that may be provided to third party entities. Moreover, service providers and other third party entities will be able to share the privacy data as long as the sharing is allowed by the consumer's privacy specifications. In addition, consumers will be able to self-audit how their privacy data is used and consumers will be able to evaluate the impact of changing their privacy specifications.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), and Microsoft's Visual Studio .NET, with the various algorithms being implemented with any combination of data structures, objects, processes, routines or other programming elements. Further, it should be noted that the present invention might employ any number of conventional techniques for data transmission, signaling, data processing, network control, and the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, ROM, flash RAM, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

As discussed above, a need exists for a system that provides individuals and other entities such as corporations (collectively referred to as "consumers" as defined above) with the ability to monitor and/or control how their privacy data is collected, assembled, and/or used. Privacy data may include any data provided by the consumer, another consumer, entity or other source (e.g., web-site) wherein the privacy data may comprise any data such as demographic data, financial data, corporate data, and the like. Examples of demographic data include, but are not limited to, name, social security number, street address, e-mail address, phone numbers, age, sex, marital status, number of dependents, education, religion, race, and/or the like. Examples of financial data include, but are not limited to, credit card information, bank account information, salary information, occupation, and/or the like. Examples of corporate data include the corporate name, employee names, salary data for employees, and the like. Other examples of privacy data include, but are not limited to, public certificates, cryptographic keys, merchant relationships, biometric information, hobbies, work experience, vehicle information, vacation information, and/or the like.

In general, consumers may participate in the system of the present invention in many different fashions. For example, consumers may participate in the privacy service system when shopping on the Internet, for example, at the web-site of a particular merchant or service provider. Alternatively, the privacy service system may be accessed as a stand-alone system that is accessible in any suitable matter such as locally, over a computer network, over a wireless network, via the Internet (e.g., through an independent web-site), or in a variety of other methods.

Figure 5:
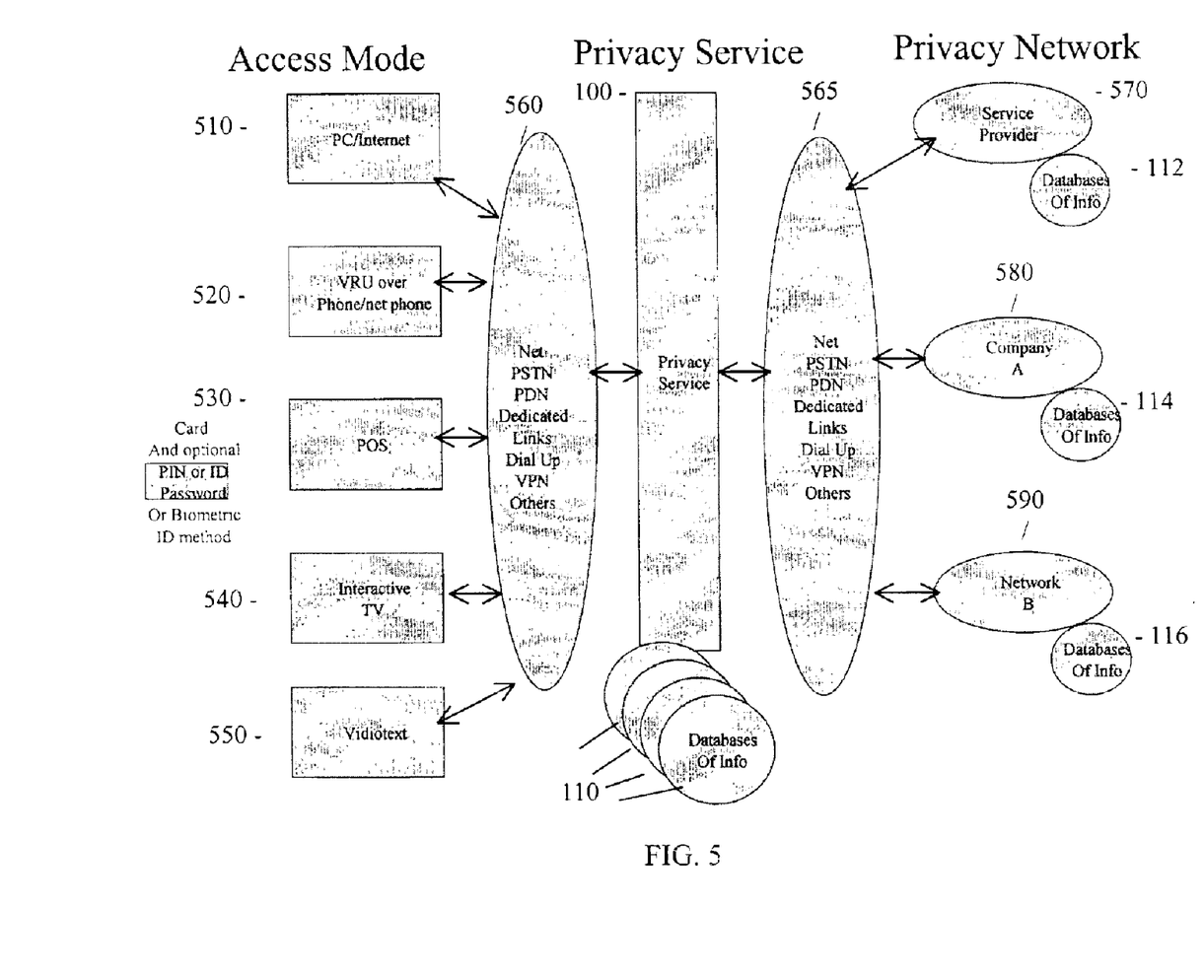
FIG. 5 illustrates an exemplary schematic diagram of the privacy service system in accordance with additional aspects of the present invention.

For example, with reference to FIG. 5, a privacy service system 100 may be accessed with a variety of access modes (500), such as, but not limited to, using a personal computer or other Internet device (e.g., personal digital assistant) connected to the Internet (510), using a voice response unit (VRU) over a telephone or cell phone or internal phone (520), using a point of sale (POS) unit (530), using an interactive TV (540), or using video text (550). A variety of networks (560) may be used by these access modes including public switched telephone network (PSTN), public data network (PDN), Internet, dedicated links, dial up links, virtual private network (VPN), and the like.

When participating in the privacy service system for the first time, the consumer may be requested to register with the system and provide demographic data such as name, address, phone numbers, age, and the like. Different combinations of demographic data may be required or optional upon registration in various embodiments of the present invention. The registration data of the consumer may be stored in a database or other suitable storage mechanism such as a computer flat file for later retrieval. It is also possible that this data may be obtained, in whole or in part, by the consumer's previous registration with a third party entity such as a service provider or a partner of the service provider. Optionally, it may be necessary for the consumer to provide their approval before the previously provided data may be used by the privacy service system.

Third party entities such as service providers (e.g., merchants) 570 and companies 580 may participate in the privacy service by registering with the system or otherwise providing their intent to participate in the privacy service. Alternatively, each third party entity may have their own privacy service that operates independently or in alliance with the privacy services of other entities. In a further alternative embodiment, a third party entity may form an alliance with other entities to create their own privacy service. In addition, an alliance of privacy services may share data, or portions of data, such that the data from one privacy service is available to the other privacy services in the alliance.

When a consumer interacts with a third party entity that participates in the privacy service, the consumer may choose to access the privacy policy of the third party entity and determine whether to provide privacy data to the third party entity. Alternatively, an automatic comparison of the third party entity's privacy policy to the consumer's privacy policy (i.e., privacy specifications) may be made and the results of the comparison may be reported to the consumer to aid in determining whether to provide privacy data to the third party entity such as, for example, similar to the P3P system discussed above.

When a consumer provides privacy data to a third party entity that participates in the privacy service, the third party entity may provide the privacy data to the privacy service for storage. The privacy data may be transmitted to the privacy service in any suitable matter. For example, the privacy data may be transmitted, via network 560, to the privacy service as soon as it is received by the third party entity. Alternatively, the privacy data may be transmitted at a later time in a batch transfer operation.

In accordance with an additional aspect of the present invention, the privacy data may be stored by the third party entity (for example, service provider 570 or company 580 illustrated in FIG. 5) in a database 112 or 114 that is maintained by the third party entity. As will be described in detail, the privacy data may be later provided by the third party entity to privacy service 100 in response to a variety of different requests such as a self-audit performed by the consumer of their privacy data or upon a dissemination request made by the consumer or other third party entity that is in accordance with the consumer's privacy policy. Stated another way, it is transparent to the consumer as to whether their privacy data is stored in database 110 that is controlled by privacy service system 100, database 112 that is controlled by service provider 570, database 114 that is controlled by company 580, or any other database that may be accessed by privacy service system 100.

Figure 1:
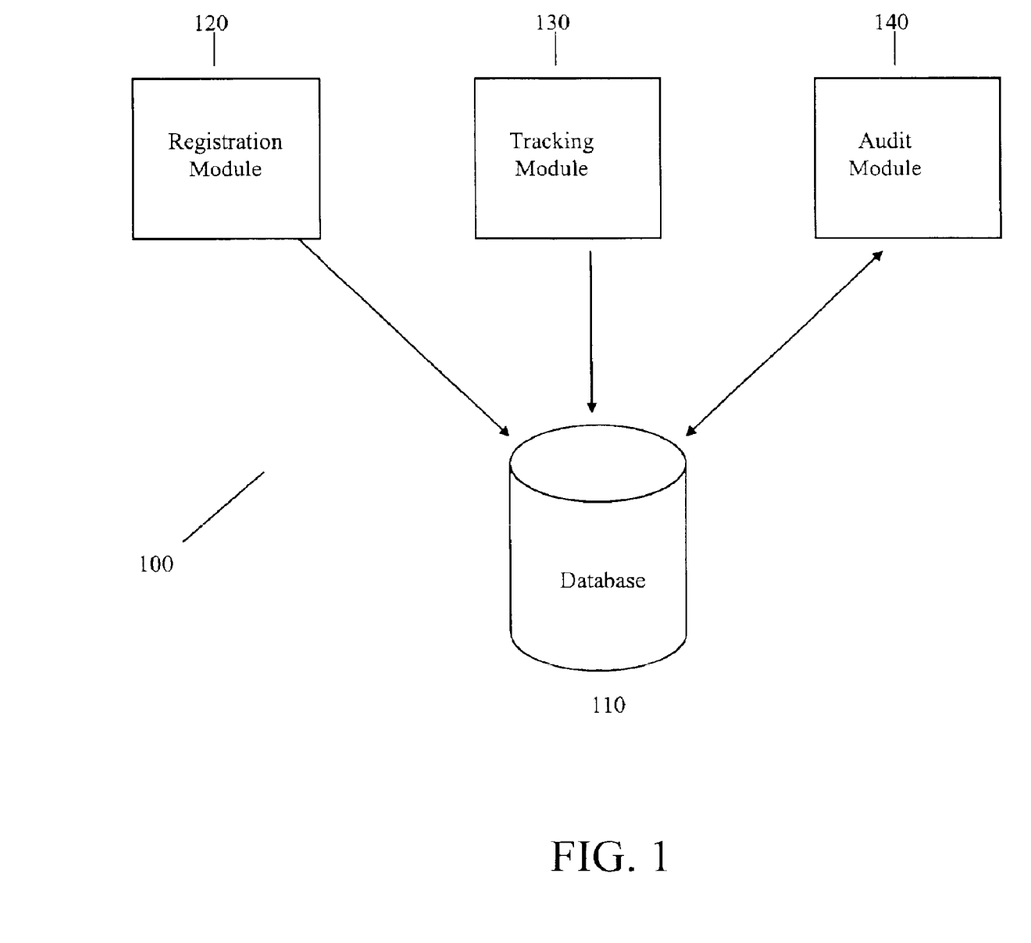
FIG. 1 illustrates an exemplary schematic diagram of a privacy service system in accordance with an embodiment of the present invention.

The privacy data may be stored by the privacy service or the third party entity along with other information about the third party entity such as name, type of entity, date, and the like. Any subsequent actions that any third party entity performs on the privacy data may be reported to the privacy service for storage and later retrieval. For example, if the third party entity provides a consumer's privacy data to a financial institution for authorization to charge a credit card of the consumer, then information about this action may be stored with the privacy service as will be described in further detail below. In this manner, an audit log of how a consumer's privacy data is collected, used and/or disseminated may be assembled at any time by privacy service system 100. Other types of actions that may be stored for later retrieval for the consumer's audit log include information about instances when privacy data is not provided to a particular entity. For example, if privacy data is not provided to a third party entity who requests the privacy data, then this action (i.e., privacy data not provided to third party entity) may also be recorded. The privacy data may not have been provided to the third party entity for a variety of reasons. For example, the third party entity may not have been approved by the consumer's privacy policy. Alternatively, information about instances when privacy data is provided to third party entities may also be stored for later retrieval during an audit of the consumer's privacy data. These instances include policy-compliant releases of privacy data.

Figure 6:
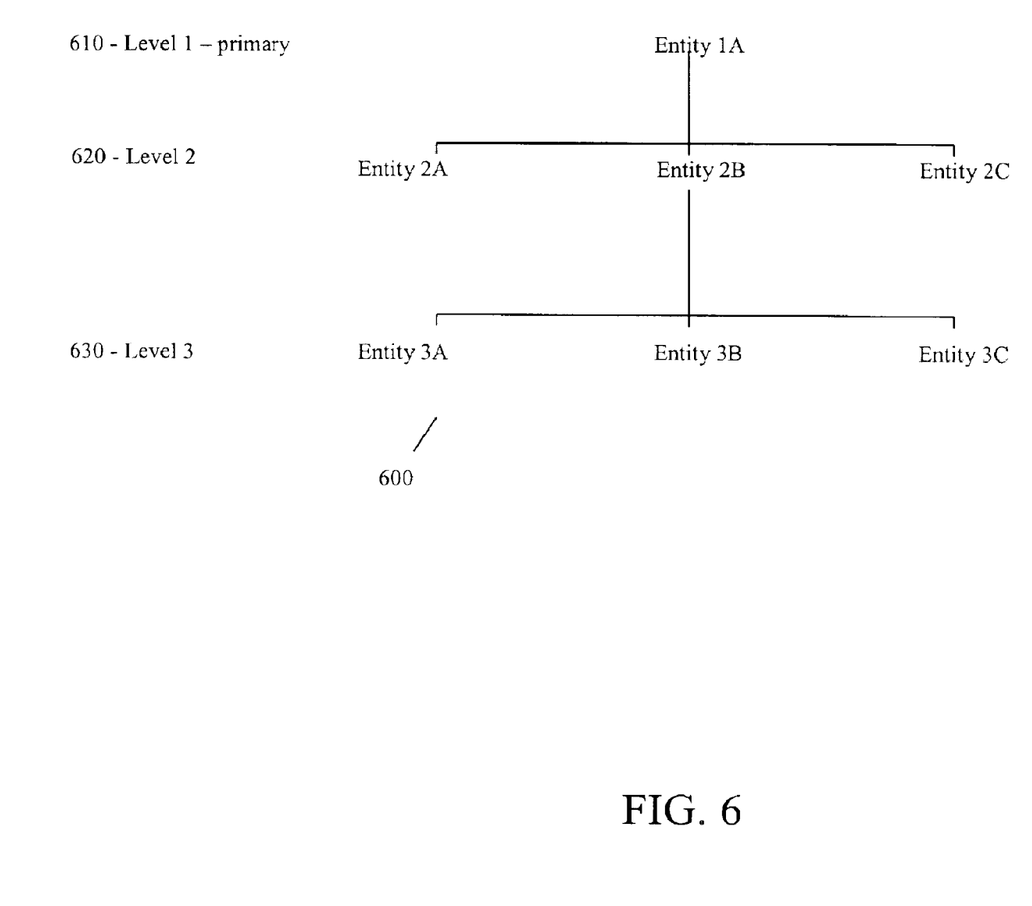
FIG. 6 illustrates an exemplary organization diagram of third party entities of the privacy service system in accordance with an embodiment of the present invention.

In accordance with another embodiment of the present invention, third party entities may be classified by level in a tree-like organization. For example, with reference to FIG. 6, a tree-like organization 600 is illustrated that shows third party entities organized in three different levels 610, 620, and 630. While tree-like organization 600 is illustrated with three different levels, it will be appreciated that tree-like organization 600 may have any number of levels and any number of entities per level. Tree level 610 comprises a primary third-party entity (entity 1A) such as a credit card company (e.g., American Express). Tree level 620 comprises second level entities 2A, 2B, 2C such as companies that may be partners of entity 1A or otherwise associated with the entity 1A. Entities 2A, 2B, 2C may include different divisions or subsidiaries of the primary third-party entity. Tree level 630 comprises third level entities 3A, 3B, 3C that have relationships with the second level entities. For example, third level entities may include shipping companies that do business with the second level entities. In accordance with this embodiment of the present invention, a consumer may allow privacy data access to just the primary entity, that is entity 1A. Alternatively, the consumer may allow privacy data access to first and second level entities, that is entities 1A, 2A, 2B, and 2C. Furthermore, the consumer may allow privacy data access to all levels of entities, that is to first, second, and third level entities. In this manner, the consumer may use their privacy data policy to specify the access level for dissemination of their privacy data.

In accordance with another aspect of the present invention, changes to the privacy data may be tracked and later accessed by the consumer. For example, privacy data may be corrected or updated by the consumer or by another entity. Information about the privacy data changes may be stored such as the source of the updated or inserted privacy data elements.

In addition, the privacy service system may compare any actions on the consumer's privacy data to the consumer's privacy policy as stored with the privacy service system and report the results of this comparison to the consumer. In this manner, the consumer may track compliant and non-compliant activities. In addition, if the privacy service system identifies a non-compliant activity, the privacy service system may report this non-compliant activity to the third party that performed or otherwise facilitated the non-compliant activity.

Consumers may access audit data so that they may perform a self-audit of how the privacy data is collected, used and/or disseminated. Consumers may use a variety of access modes 510, 520, 530, 540, 550 to access audit data. If a consumer is not satisfied with how the privacy data is collected, used and/or disseminated, the consumer may take several different types of actions. For example, consumers may modify their privacy policy to prohibit the future collection, use or dissemination of their privacy data by a particular entity or by a type or class of particular entities (e.g., all sub-prime financial institutions or all bookstores). Alternatively, consumers may modify their privacy policy to allow the future dissemination of their privacy data to entities that were previously disallowed to receive their privacy data. In addition, consumers may audit their privacy data to determine if the privacy data is correct. If the information is incorrect (e.g., incorrect address) or otherwise needs updating, the consumer may correct/update this information and the privacy service may disseminate the corrected information to the appropriate entities including associated third parties and government entities (e.g., FBI, Social Security Agency, and the like).

By providing the capability to disseminate updated privacy information to third parties, the privacy service system allows consumers to change data at one location and to then disseminate the updated data to various entities that need or use the updated information. Optionally, in exchange for the consumers paying a fee, the privacy service system may automatically notify designated third parties about the updated privacy information. For example, if the consumer updates their address, the privacy service (optionally in exchange for a fee) provides the consumer with the capability to automatically notify designated third parties, such as the consumer's credit card companies, with the updated address.

Similarly, the privacy service system provides a centralized location or contact point for various entities to request all or some privacy data for a particular consumer. For example, a government agency such as the FBI may have controlled access to use the privacy service system to request privacy data for a particular consumer. It will be appreciated that this provides a controlled and centralized access point for third parties to request privacy data.

Consumers may use the privacy service system of the present invention to allow or disallow dissemination of privacy data to any entity for a certain amount of monetary or non-monetary reward. For example, consumers may allow dissemination of a certain class of privacy data for a certain amount of reward, and for an additional amount of reward the consumer may authorize the dissemination of even more privacy data. Finally, the consumer may specify that certain privacy data should never be released for any amount of reward.

Referring to FIG. 1, in accordance with one embodiment of the present invention, a privacy service system 100 suitably includes a database 110, a registration module 120, a tracking module 130, and an audit module 140. Database 110 is any hardware and/or software suitably configured to store privacy data, audit logs for the privacy data, and/or privacy policies for individual consumers and for third party entities. As used in the system of the present invention, database 110 and databases 112, 114, 116 may be any type of database, such as relational, hierarchical, object-oriented, flat files, and/or the like. Common database products that may be used to implement the database include DB2 by IBM (White Plains, N.Y.), any of the database products available from Oracle Corporation (Redwood Shores, Calif.), Microsoft Access by Microsoft Corporation (Redmond, Wash.), any other database product, spreadsheets, flat files, or the like. Database 110 may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Database 110 may be located in a centralized location and operated by an independent entity. Alternatively, database 110 may be distributed in various locations. For example, each third party entity may maintain their own database (e.g., see databases 112 and 114 in FIG. 5) for storing privacy data that the third party entity collects from a consumer, receives from another entity, or disseminates to another entity. The distributed databases may be accessible via a suitable network 565 such that the user of the privacy system can access the privacy data.

System 100 may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, Windows XP, etc.) as well as various conventional support software and drivers typically associated with computers. User computer can be in a home or business environment with access to a network. In an exemplary embodiment, access is through the Internet through a commercially-available web-browser software package.

Communication between consumers, third party entities, other users, and system 100 of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

In accordance with one embodiment of the present invention, privacy service system 100 may provide a suitable website or other Internet-based graphical user interface which is accessible by consumers and other users of the system. In another embodiment of the present invention, privacy service system 100 may be accessible via a website that is operated by a third party entity such as a merchant who sells goods and/or services on the Internet. In further alternate embodiments of the present invention, privacy service system 100 may be available through the graphical user interface of a software application that may be accessed over a computer network, through voice prompts for a VRU, through customer agents (e.g., over the telephone or in person), and the like.

With continued reference to FIG. 1, registration module 120 suitably comprises any hardware and/or software suitably configured to receive information, process information, and interact with the other components of system 100. In one embodiment, registration module 120 receives registration information provided by a consumer who desires to register with privacy service system 100. As discussed above, the registration information may comprise various demographic and/or financial data from the consumer such as name, address, phone numbers, ages, sex, credit card information, salary, and/or the like. Registration module 120 may perform various processes on the received information, such as verification of name and address and other received information, and verification that consumer has not previously registered, for example. Database 110 may be configured to store the registration information for the consumer. In accordance with another embodiment of the present invention, the consumer's registration information may be obtained, in whole or in part, by previous registrations with a service provider or other third party entity (e.g., government agency such as the social security agency) that is associated with the privacy service system. In addition, the privacy service system may require the consumer's authorization before obtaining the consumer's registration information from the previous registrations.

In one embodiment of the present invention, registration module 120 may be further configured to receive registration information from third party entities such as service providers who desire to register with privacy service system 100. The registration information may comprise any suitable information to identify the third party entity. In addition, the registration information may include the privacy policy of the third party entity for use in comparison to the privacy policy of an individual consumer. Database 110 may be further configured to store the registration information for the third party entity.

Tracking module 130 comprises any hardware and/or software suitably configured to receive information, process information, store information in database 110, and/or interact with the other components of system 100. In one embodiment, tracking module 130 may receive privacy data from a third party entity wherein a consumer provided the privacy data. If the consumer is registered with privacy service system 100, tracking module 130 may update database 110 and/or the audit log available for the consumer with information about the third party entity and the received privacy data. If the consumer is not registered with the privacy service system, tracking module 130 may create a new database record in database 110 and store the privacy data in the new database record. Tracking module 130 may interact with registration module 120 to register the new consumer with privacy service system 100. Tracking module 130 may interact with many other logs of privacy service system 100, such as error logs, transaction logs, security logs, system logs, and the like.

In accordance with another aspect of the present invention, tracking module 130 may receive tracking information regarding the use or dissemination of privacy data for a consumer. This information may be provided by, for example, a third party entity such as a banking institution who disseminates privacy data to another service provider such as a brokerage. The tracking information may include information such as the sender of the privacy data, the receiver of the privacy data, and the content of the privacy data that was disseminated. It will be appreciated that this is just one example of tracking information, and that the tracking information may comprise any information regarding any use or dissemination of privacy data. Tracking module 130 may store the tracking information in database 110 such that the audit log for the individual consumer may be updated.

Audit module 140 comprises any hardware and/or software suitably configured to allow a user to audit privacy data and interact with the other components of system 100. In one embodiment, audit module 140 may provide a graphical user interface, such as a graphical user interface 200 illustrated in FIG. 2, such that a consumer may use graphical user interface 200 to perform a self-audit of their privacy data. For example, the consumer may use graphical user interface 200 to display audit log information 210 such as date and time of access (220), accessing entity (230), class of access (240), privacy data accessed (250), and whether the access was allowed or disallowed (260). Another example of audit log information that may be provided to users of the system includes aggregate reporting on requests for privacy data. For example, the number of requests that were granted or denied could be reported for a specified time period such as a day, week, month, and the like. Another example includes allowing the user to view a list of updates to the privacy data. Updates to the privacy data may include modifications, insertions, and/or deletions of privacy data. For example, information about updates to the privacy data may be provided such as date of the update, name of the data element that was updated, the old privacy data, the new privacy data, and the source of the update. The source of the update may include "were provided" or any of a variety of other sources such as the originating web-site that collected the privacy data. These examples of audit log information are only a couple of examples of the many different types of audit log information that may be provided by the present invention.

Figure 2:
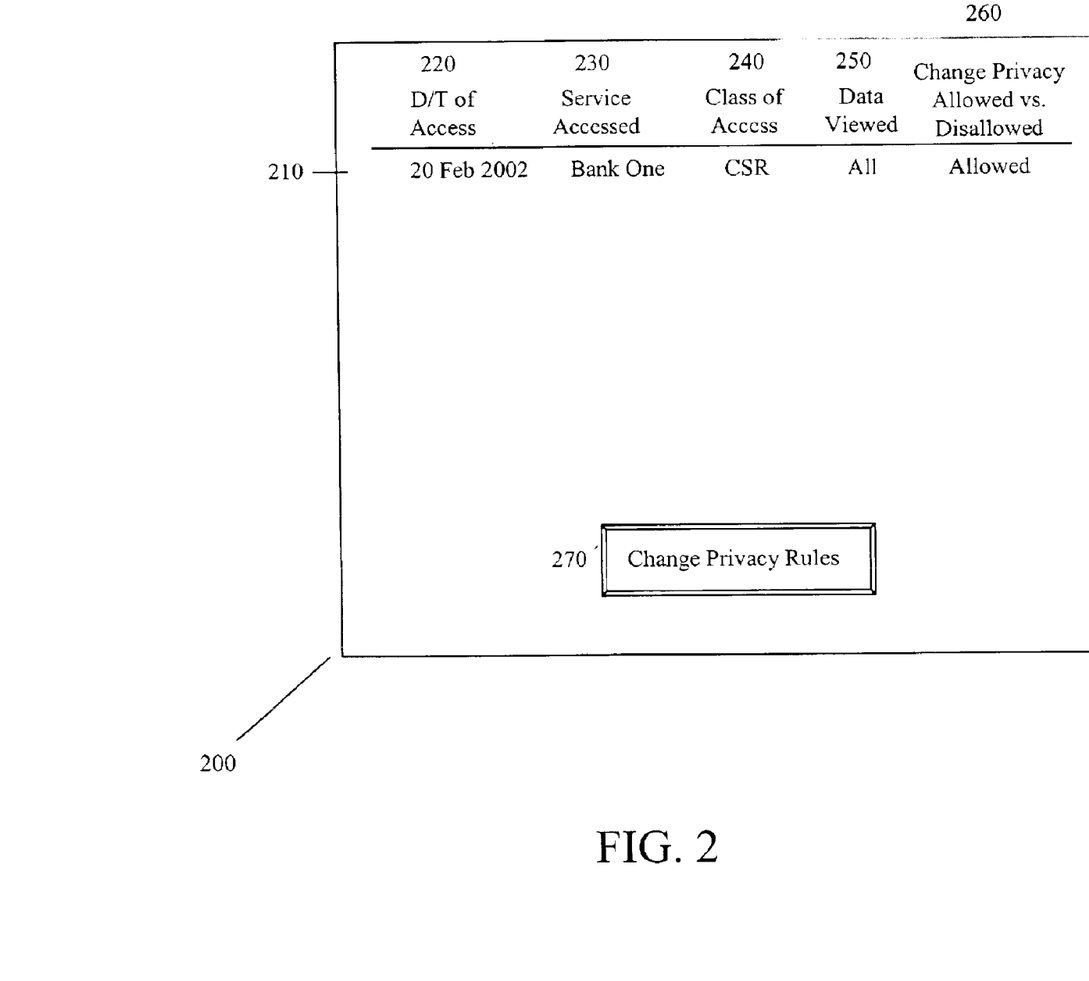
FIG. 2 illustrates an exemplary graphical user interface for performing a self audit of privacy data in accordance with an embodiment of the present invention.

In accordance with one embodiment of the present invention, exemplary values for class of access 240 include customer service request (CSR), self service access (i.e., access by the individual consumer), internal marketing access for cross sell, external partner access for transaction requirement, external partner marketing access for cross sell/sale, sale of data to partner, and/or the like. The consumer may use the graphical user interface 200 to change access rights for the various classes of access. For example, the consumer may click or otherwise activate button 270 of interface 200 to change their privacy policy. In this manner, the consumer may allow/disallow various classes of access for various third party entities.

Figure 3:
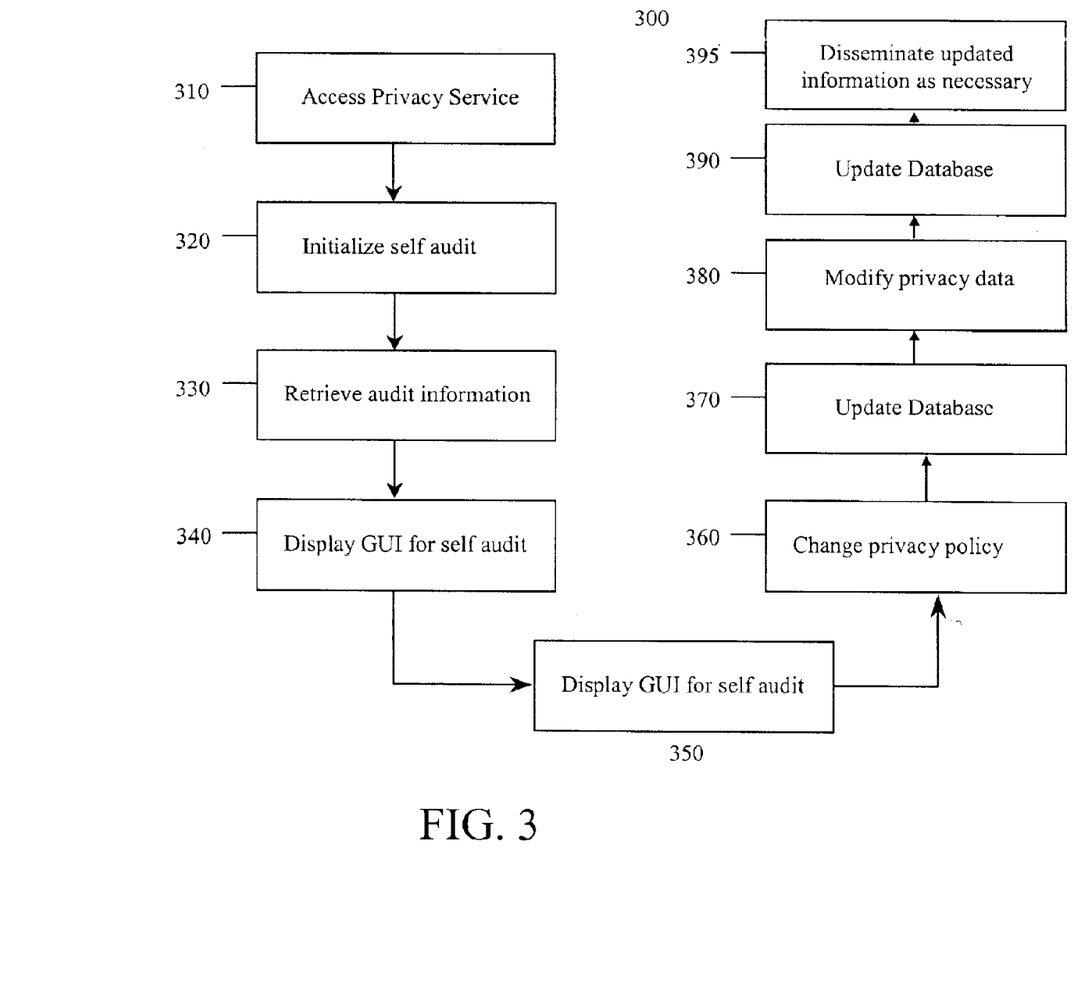
FIG. 3 illustrates a flow diagram of an exemplary process of the privacy service system in accordance with the present invention.
Figure 4:
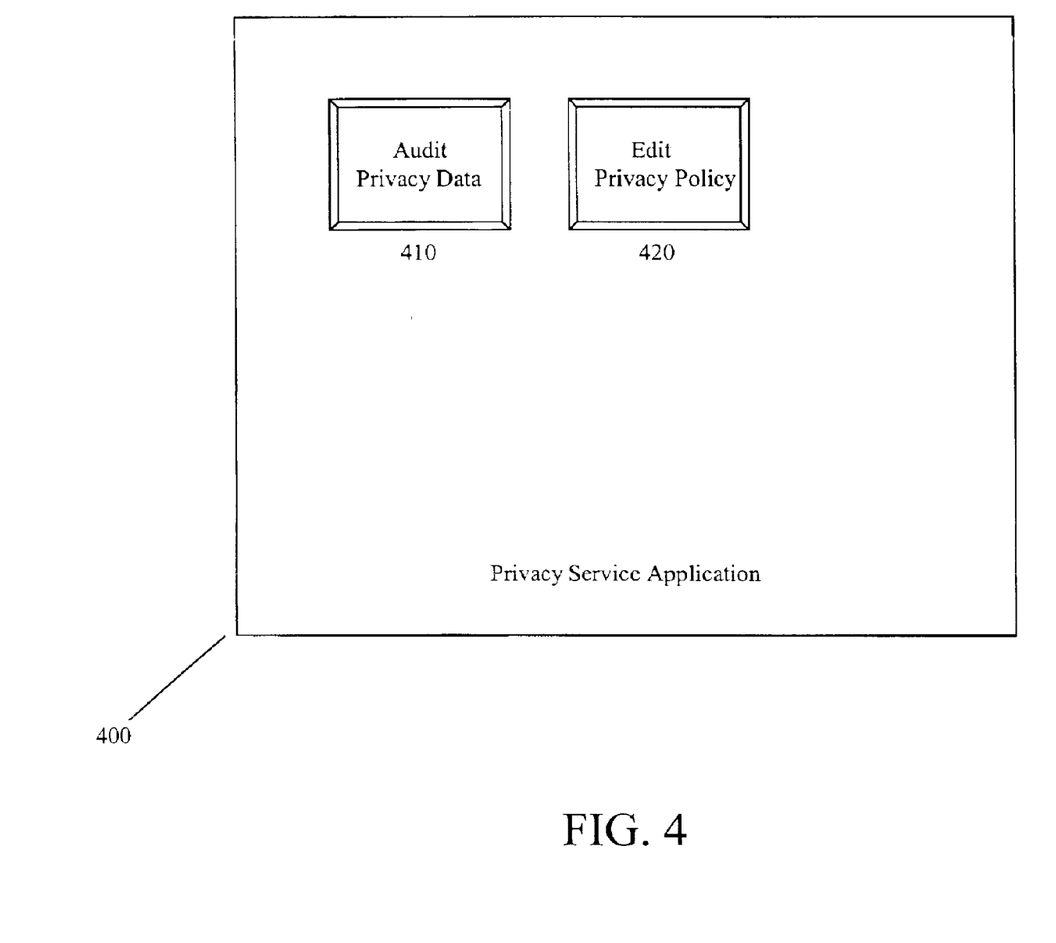
FIG. 4 illustrates an exemplary graphical user interface for accessing the privacy service system in accordance with an embodiment of the present invention.

In operation, privacy service system 100 facilitates monitoring and/or controlling the collection, use and/or dissemination of privacy data. FIG. 3 is a flow diagram of an exemplary process for performing a self-audit of privacy data. With reference now to FIG. 3, an exemplary process 300 includes a user (e.g., consumer, entity, software and/or hardware) accessing the privacy service system by selecting a computer application on their computer desktop to activate an exemplary graphical user interface 400 (see FIG. 4) or by browsing through a web site where the privacy service system may be accessed (310) through the exemplary graphical user interface 400. With momentary reference to FIG. 4, the consumer may activate the audit function (320) of the privacy service system by selecting button 410 of the graphical user interface 400. Upon activation of the audit function, audit information for the consumer may be retrieved from database 110 (330). Alternatively, the audit information may be retrieved from databases 112, 114, 116 (via network 565) that are maintained by third party entities. Stated another way, the consumer's privacy data may be gathered from one or many different databases or files for sorting, collating, and other audit activities performed by the consumer. The retrieved audit information may be used to populate a graphical user interface such as interface 200 (see FIG. 2) for display to the consumer (340). Using the graphical user interface, the consumer may browse the retrieved audit information (350) to audit how their privacy data was accessed, used and/or disseminated by third party entities. If desired, the consumer may change their privacy policy (360) as desired. For example, the consumer may want to enable or disable certain classes of access for all or a specific set of third party entities as discussed above. Once the consumer has updated its privacy policy, the updated information may be stored in database 110 by audit module 140 (370).

In addition, the consumer may correct privacy data that is incorrect (380). For example, if the consumer's address is incorrect, the consumer may use the graphical user interface to correct their address and the updated information will be stored in database 110 by audit module 140 (390). Furthermore, audit module 140 may disseminate the corrected privacy data to any appropriate third party entity (395).

It will be appreciated that the present invention may be used for the early detection of various types of identity fraud. For example, the consumer may notice that third party entities, such as merchants, are accessing the consumer's credit card information or other privacy data. If the third party entities are not known to the consumer, then further investigation by consumer may determine that the consumer's privacy data is being used in a fraudulent manner and the consumer can take appropriate action to end the identity fraud before it proceeds any further. In accordance with one aspect of the present invention, the consumer may use privacy service system 100 to take appropriate actions such as notifying various financial institutions of the identify fraud. Alternatively, privacy service system 100 may automatically take appropriate actions such as notifying financial institutions and the like.

It will be appreciated that many applications of the present invention could be formulated. One skilled in the art will appreciate that network 110 may interface with any system for exchanging data or transacting business, such as the Internet, an intranet, an extranet, WAN, LAN, satellite communications, and/or the like. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris, Windows XP, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A method for facilitating a self audit of a first privacy data associated with a first user and a second privacy data associated with a second user, comprising the steps:

collecting the first privacy data associated with the first user;

storing the first privacy data in a central database;

collecting the second privacy data associated with the second user;

storing the second privacy data in the central database;

facilitating the first user to self audit the first privacy data, wherein the first user is restricted from auditing the second privacy data, and wherein the self audit comprises:

retrieving audit information for the stored first privacy data;

reviewing the retrieved audit information; and changing a first privacy policy and the first privacy data associated with the first user based on the first user's review of the audit information; and facilitating the second user to self audit the second privacy data, wherein the second user is restricted from auditing the first privacy data, and wherein the self audit comprises:

retrieving audit information for the stored second privacy data;

reviewing the retrieved audit information; and
changing a second privacy policy and the second privacy data associated with the second user based on the second user's review of the audit information.

2. The method of claim 1, wherein said step of collecting the first privacy data comprises collecting the first privacy data in accordance with the first privacy policy, and wherein said step of collecting the second privacy data comprises collecting the second privacy data in accordance with the second privacy policy.

3. The method of claim 1, wherein said steps of storing the first and second privacy data comprises storing the first and second privacy data in a plurality of distributed databases.

4. The method of claim 1, further comprising the steps of:
tracking access made to the first privacy data in the form of a first tracking data;
providing said first tracking data to the first user.

5. The method of claim 4, wherein said step of tracking comprises:
tracking a subset of modifications made to the first privacy data;
tracking a subset of deletions made to the first privacy data;
tracking a subset of additions made to the first privacy data;
tracking an identity of one or more accessing entities that access the first privacy data; and
tracking a date and a time of one or more accesses made to the first privacy data.

6. The method of claim 5, wherein said step of tracking further comprises tracking a content of the first privacy data accessed by one of the accessing entities.

7. The method of claim 5, wherein said step of tracking further comprises tracking a dissemination of the first privacy data by one of the accessing entities.

8. The method of claim 1, further comprising the steps of providing the first user with the capability of modifying the first privacy data and providing the second user with the capability of modifying the second privacy data.

9. The method of claim 8, further comprising the step of propagating the modified first and second privacy data to associated third parties.

10. The method of claim 8, further comprising the step of propagating the modified first and second privacy data to associated government entities.

11. The method of claim 1, further comprising the step of classifying a plurality of third party entities into a plurality of classes; and
wherein said step of facilitating the first user to self audit includes providing the first user with a capability to allow and disallow access to the first privacy data to specified classes of third party entities, and wherein said step of facilitating the second user to self audit includes providing the second user with a capability to allow and disallow access to the second privacy data to specified classes of third party entities.

12. The method of claim 11, further comprising the step of disclosing an identity of one or more third party entities that is allowed access to the first privacy data.

13. The method of claim 11, further comprising the step of disclosing an identity of one or more third party entities that is disallowed access to the first privacy data.

14. The method of claim 11, further comprising the step of disclosing a content of the first privacy data that may be accessed.

15. The method of claim 1, further comprising the steps of:
disseminating the first privacy data; and
rewarding the first user for the disseminating of the first privacy data.

16. The method of claim 1, wherein the step of facilitating the first user to self audit the first privacy data further comprises:
providing a plurality of access modes to the first user for accessing the first privacy data;
reporting the first privacy data to the first user;
reporting all uses of the first privacy data to the first user;
reporting all dissemination of the first privacy data to the first user;
allowing the first user to change the first privacy data; and
allowing the first user to change access to the first privacy data.

17. The method of claim 16, wherein the plurality of access modes includes accessing the first privacy data by one of an Internet device, a voice response unit, a point of sale terminal, an interactive television, a telephone, and a video text.

18. A method of facilitating the use of a first privacy data associated with a first entity and a second privacy data associated with a second entity, comprising the steps of:
storing said first and second privacy data;
tracking all access made to said first and second privacy data;
comparing said access to said first privacy data to a first policy of the first entity;
comparing said access to said second privacy data to a second policy of the second entity;
reporting said comparison of said first policy to the first entity;
reporting said comparison of said second policy to second entity;
facilitating the first entity to self audit the first privacy data, wherein the first entity is restricted from auditing the second privacy data, and wherein the self audit comprises:
retrieving audit information for the stored first privacy data;
reviewing the retrieved audit information; and
changing the first privacy policy and the first privacy data based on the first entity's review of the audit information; and
facilitating the second entity to self audit the second privacy data, wherein the second entity is restricted from auditing the first privacy data, and wherein the self audit comprises:
retrieving audit information for the stored second privacy data;
reviewing the retrieved audit information; and
changing the second privacy policy and the second privacy data based on the second entity's review of the audit information.

19. The method of claim 18, further comprising the step of automatically paying a royalty to the first entity, wherein said royalty is based on said access made to said first privacy data.

20. A privacy service system for maintaining a first privacy data associated with a first user having a first privacy policy and a second privacy data associated with a second user having a second privacy policy, said system comprising:

a database for storing the first and second privacy data;

a registration module configured to register the first user and the second user for the privacy service;

a tracking module configured to track access to the first privacy data associated with the first user and to track access to the second privacy data associated with the second user; and an audit module configured to allow the first user to self audit the first privacy data, wherein the first user is restricted from auditing the second privacy data, wherein the audit module is configured to retrieve audit information for the first privacy data from the database, to allow the first user to review the audit information, and to allow the first user to change the first privacy policy and the first privacy data based on the first user's review of the audit information; and wherein the audit module is further configured to allow the second user to self audit the second privacy data.

* * * * *